United States Patent

Lau

[11] 4,313,416
[45] Feb. 2, 1982

[54] WOK BURNER

[76] Inventor: Ka K. Lau, 3636 Veteran Ave., Los Angeles, Calif. 90034

[21] Appl. No.: 72,320

[22] Filed: Sep. 4, 1979

[51] Int. Cl.$^3$ .................. F24C 3/00; F27D 11/00; H05B 3/68

[52] U.S. Cl. .................. 126/39 E; 126/39 BA; 219/432; 219/456

[58] Field of Search .................. 126/373, 39 E, 39 D, 126/39 C, 390, 39 BA; 219/456, 455, 415

[56] References Cited

U.S. PATENT DOCUMENTS

| | | | |
|---|---|---|---|
| 1,716,329 | 6/1929 | Simpson | 126/39 H |
| 2,270,293 | 1/1942 | Grunder | 219/456 |
| 2,324,046 | 7/1943 | Doren et al. | 126/39 BA |
| 2,417,977 | 3/1947 | French | 126/39 C |
| 3,505,498 | 4/1970 | Sheylin | 219/432 |
| 3,822,982 | 7/1974 | Du Perow | 126/39 E |
| 3,829,655 | 8/1974 | Thibault | 219/432 |
| 4,241,288 | 12/1980 | Aoshima et al. | 219/432 |

FOREIGN PATENT DOCUMENTS 807974  7/1951  Fed. Rep. of Germany ...... 219/455

Primary Examiner—Samuel Scott
Assistant Examiner—Wesley S. Ratliff, Jr.
Attorney, Agent, or Firm—Ralph B. Pastoriza

[57] ABSTRACT

A stove burner includes heating elements lying on a concave surface when viewed from above so that elements closer to the central portion are at a greater depth than elements towards the outer portion. The heating elements may constitute concentric pipes of decreasing radii when viewed in plan and at successively greater depths from the surface of the stove when viewed in elevation so as to define the concave surface. Alternatively, the heating elements may constitute an electrical resistance element following a spiral path wherein successive spirals are at increasing levels from the top surface of the stove when viewed from the side. The radius of curvature of the concave heating element configuration is made to match substantially the radius of curvature of the bottom surface of a wok (shallow steel pan with handles). By such an arrangement, the bottom surface of the wok is substantially uniformly heated from its central areas out to its periphery thereby resulting in more efficient use of heat in cooking with the wok.

1 Claim, 5 Drawing Figures

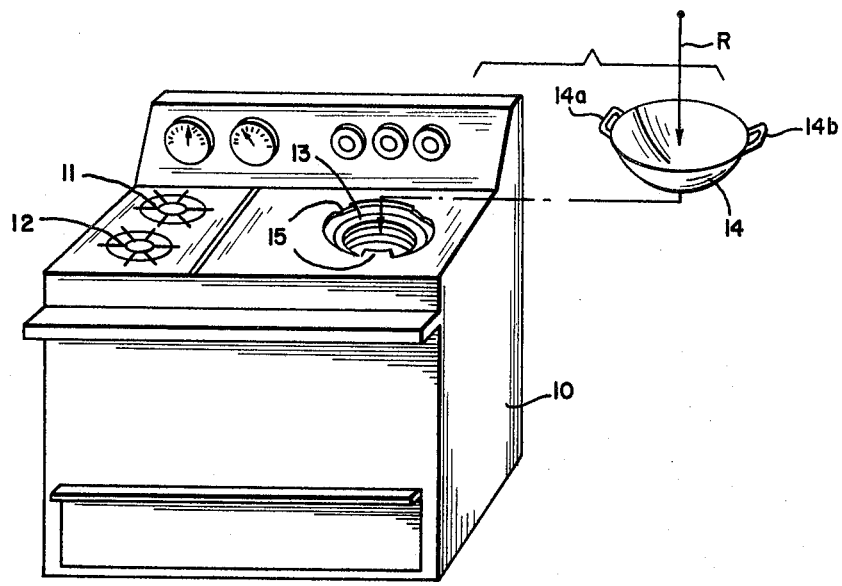
FIG. 1
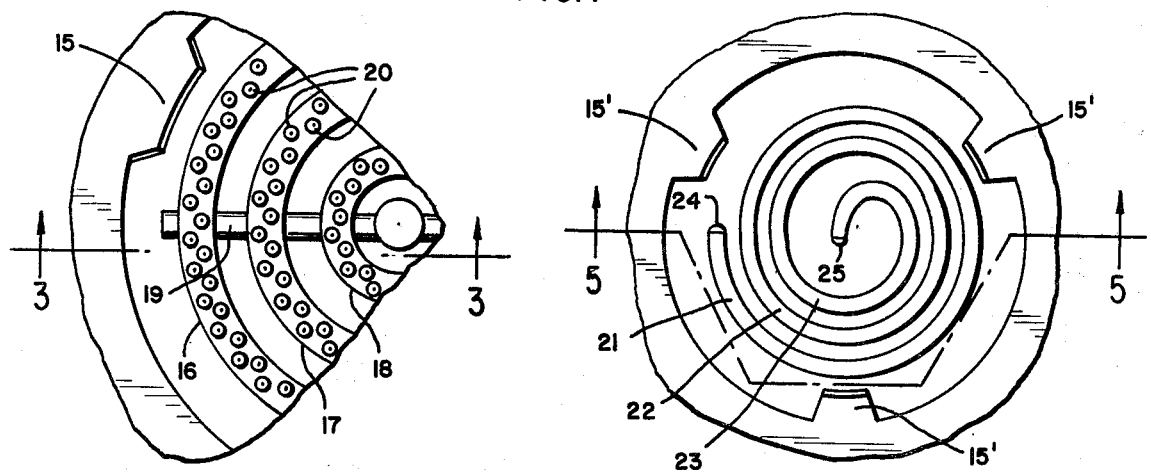
FIG. 2
FIG. 4
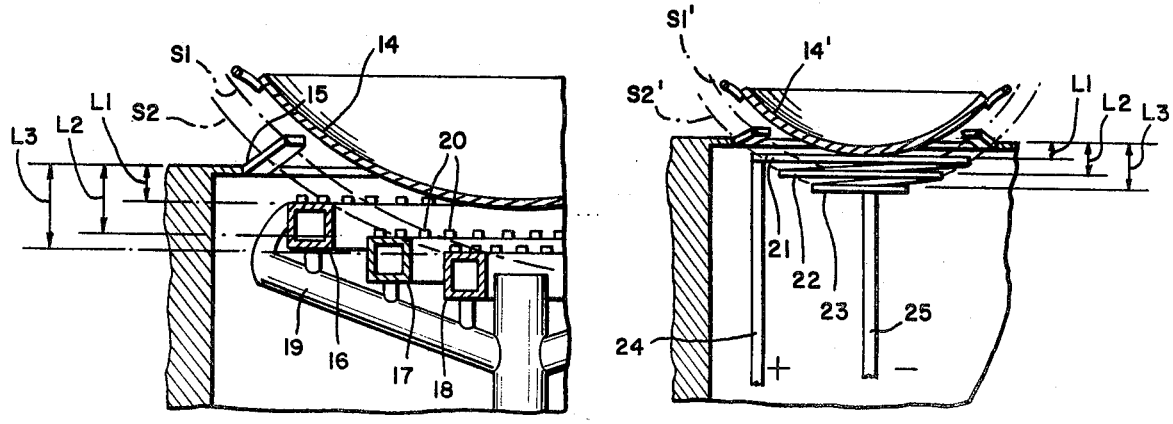
FIG. 3
FIG. 5

WOK BURNER

This invention relates generally to stoves and more particularly to a stove burner structure particularly useful for cooking pans with rounded bottom surfaces such as woks.

BACKGROUND OF THE INVENTION

A wok constitutes a very important part of Chinese cooking equipment that makes possible many delicacies. Basically, the wok takes the form of a shallow steel pan generally with a rounded bottom and diametrically opposite handles. Because of its steel construction which is highly thermally conducting, and its shallow configuration, it distributes heat over a relatively wide area while concentrating liquid at the central or bottom portion. This arrangement permits a maximum of searing with a minimum of shortening which is very desirable for the stir and fry technique of Chinese cooking. Because the food ingredients are sliced, chopped, cubed or shredded, wok cooking takes only a few moments—three to ten minutes. By such rapid cooking, there is preserved the delicate flavor nuances lost in other cooking methods.

In addition to the foregoing, a wok is a fairly flexible cooking utensil. Besides a stirrer-fryer it can serve as well as a griddle, omelet pan, roasting pan, soup kettle and so forth. It will work with a gas range or stove, an electric burner, or a charcoal fire.

A problem associated with wok cooking, however, is the fact that the exterior bottom surface of the wok is generally rounded as noted above. Most cooking elements in stoves and the like, however, lie in a plane. As a consequence, when the wok is positioned over the conventional burner, the central portion of the wok tends to receive more heat than the outer areas of the wok simply because the central areas are closer to the central burners than are the outer areas to the outer burners. It would be very desirable if there were some means for assuring substantially uniform heating of the exterior bottom wok surface.

BRIEF DESCRIPTION OF THE PRESENT INVENTION

With the foregoing considerations in mind, the present invention contemplates an improved wok burner so designed as to assure a more uniform heating of the wok all to the end that the entire wok surface attains substantially the same temperature and to the further end that energy is conserved in that optimum use is made of the fuel whether it be charcoal, gas or electrical energy.

More particularly, in accord with this invention, the burner in its broadest aspect comprises a heating means following a path which lies on a concave surface of radius of curvature at least equal to the radius of curvature of the bottom surface of the wok. Appropriate supporting means, in turn, are provided for holding the wok with its bottom convex exterior surface received at least partially within the concave surface so that the central and outer areas of the wok are substantially equally spaced from the heating means whereby the wok receives substantially uniform heat over a major portion of its bottom surface.

The heating means may take the form of concentric gas pipes in the form of rings with appropriate gas jets which rings are disposed at successively increasing levels from the surface support for the wok; a spiral electrical resistance heater, the spiral itself falling on a concave surface so that successive spirals are at different levels when viewed from the side; or, concentric annular steps of increasing depth as their radii decrease for supporting any type of heating means such as charcoal or the like.

Regardless of the actual heating means, there is in common with all, the concave configuration of the heating means to conform substantially to the bottom surface of the wok and thereby provide for the efficient heating as described.

BRIEF DESCRIPTION OF THE DRAWINGS

A better understanding of this invention will be had by now referring to the accompanying drawings in which:

FIG. 1 is a perspective view of a typical stove or range wherein there is provided for at least one of the burners a wok burner in accord with the present invention;

FIG. 2 is an enlarged fragmentary plan view of a portion of the burner in the stove of FIG. 1;

FIG. 3 is a fragmentary cross section in elevation of the structure taken in the direction of the arrows 3—3 of FIG. 2;

FIG. 4 is a fragmentary plan view of an alternative type of heating means making up the wok burner of this invention; and FIG. 5 is a fragmentary cross section looking in the direction of the arrows 5—5 of FIG. 4.

DETAILED DESCRIPTION OF THE INVENTION

Referring first to FIG. 1, there is shown a typical stove or range 10 provided with conventional burners 11 and 12.

In accord with the present invention, there is provided a special wok burner 13 constructed into the stove 10. Wok burner 13 is arranged to heat a wok illustrated exploded away from the stove 10 at 14.

Considering the wok 14 in detail, it will be noted that the same is in the form of a shallow steel pan provided with diametrically opposite handles 14a and 14b. The bottom surface of the wok is convex and has a radius of curvature indicated in FIG. 1 at R.

The wok 14 is arranged to be supported on the wok burner 13 of this invention by appropriate support means in the form of circumferentially spaced flanges 15.

Referring now to the enlarged fragmentary plan view of FIG. 2, the burner 13 in the stove 10 of FIG. 1 comprises appropriate heating means in the form of a series of concentric rings 16, 17 and 18 of decreasing radii when viewed in plan. Each of these rings is supplied with gas through a combined support and radially extending gas pipe 19. The gas in turn is emitted through appropriate jets 20 on each of the rings.

Referring to the side elevational fragmentary view of FIG. 3, it will be noted that the successive concentric rings 16, 17 and 18 are positioned at successively lower levels respectively indicated L1, L2 and L3 from the surface of the stove.

In FIG. 3, the wok 14 is shown exploded above the supporting flanges such as the flange 15 for the stove in order to avoid obscuring the drawing. When the wok 14 is properly supported, its bottom convex surface will assume the position indicated by the dashed surface line S1.

The paths followed by the various gas emitting nozzles 20 on the concentric rings, on the other hand, will lie on a concave surface designated by the dashed line S2 in FIG. 3. The radius of curvature of this surface S2 is at least equal to the radius of curvature R for the surface S1 of the wok 14 described in FIG. 1 such that when the wok 14 is resting on the flanges 15, its bottom convex surface S1 will be at least partially received within the concave surface S2 and the central portion of the wok will be spaced from the central burners by the same distance as the outer portions are spaced from the outer burners. As a consequence, it will be appreciated that the major area of the bottom surface of the wok will be substantially uniformly heated.

Referring now to FIG. 4, there is shown another embodiment of the invention wherein the heating means takes the form of an electrical resistance material following a spiral path when viewed in plan. Various spiral turns are indicated at 21, 22 and 23 in FIG. 4 along with the various support flanges designated 15'. Terminals at the outer and inner ends of the spiral for connection to a source of electrical energy are indicated in FIG. 4 at 24 and 25. It will be noted that the successive spiral turns 21, 22 and 23 decrease in radius as viewed in FIG. 4.

Referring now to the cross sectional view of FIG. 5, it will be further noted that the successive spiral turns 21, 22 and 23 are positioned at increasing levels from the surface of the stove as indicated at L1, L2 and L3 respectively.

As a consequence of the foregoing configuration, there is again defined a concave surface indicated at S2' upon which the paths followed by the spiral lie.

This concave surface S2' for the heating means in the form of the electrical resistance material matches essentially the convex exterior surface S1' for the wok 14' again shown exploded above the burner in FIG. 5. When the wok 14' is in proper position, its bottom surface will lie along the surface S1' in substantially uniformly spaced relationship from the burner spirals.

It will thus be appreciated that again the central and outer areas of the wok are substantially equally spaced from corresponding burner elements so that substantially uniform heating of the wok will result.

While not shown in the drawings, it will be understood that concentric steps following the same paths as the burners 16, 17 and 18 could be provided for supporting any combustible material such as charcoal so that again there is defined a concave burner for efficient heating of the wok.

Still referring to FIG. 5, the resistance material making up the electrical resistance heater can be self-supporting the terminals 24 and 25 themselves also serving as a support of the structure to the stove or range.

While this invention has been described with respect to a stove or range, it should be understood that the wok burner can be an individual burner wholly separated from any stove or range either of the gas or electric type, or, as mentioned, can be a specially designed receptacle for charcoals in the form of annular concentric steps. In the latter instance, outdoor barbecues could be appropriately constructed for wok cooking utilizing the principles of this invention.

Further, while the invention is described with regard to a wok, the burner can have a configuration matching the bottom and sides of equivalent cooking pans.

I claim:

1. A wok burner wherein the rounded convex bottom of the wok has a given radius of curvature, said burner comprising:
  (a) heating means comprising a series of concentric rings of decreasing radii when viewed in plan and at successively lower levels when viewed in elevation to define a concave surface of radius of curvature at least equal to the radius of curvature of said wok for receiving said wok, said rings having jet gas openings for emitting gas, and
  (b) supporting flanges circumferentially spaced about the periphery of said heating means for holding said wok with its bottom convex exterior surface received at least partially within said concave surface so that the central and outer areas of the bottom of said wok are substantially uniformly spaced from said heating means whereby the bottom of said wok receives substantially uniform heat over a major portion of its surface.

* * * * *